United States Patent
Miller et al.

(10) Patent No.: US 11,720,936 B2
(45) Date of Patent: *Aug. 8, 2023

(54) PRICE ESTIMATION SYSTEM

(71) Applicant: Home Depot Product Authority, LLC, Atlanta, GA (US)

(72) Inventors: Robert L. Miller, Atlanta, GA (US); John S. Schulte, Atlanta, GA (US); Mika Illouz, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 831 days.

This patent is subject to a terminal disclaimer.

(21) Appl. No.: 16/660,316

(22) Filed: Oct. 22, 2019

(65) Prior Publication Data

US 2020/0051143 A1 Feb. 13, 2020

Related U.S. Application Data

(62) Division of application No. 13/837,342, filed on Mar. 15, 2013, now Pat. No. 10,453,103.

(51) Int. Cl.
*G06Q 30/00* (2023.01)
*G06Q 30/0283* (2023.01)
*G06Q 30/0601* (2023.01)

(52) U.S. Cl.
CPC ..... *G06Q 30/0283* (2013.01); *G06Q 30/0611* (2013.01)

(58) Field of Classification Search
CPC .............. G06Q 30/0283; G06Q 30/0611
USPC ................................ 705/26.1–27.2
See application file for complete search history.

(56) References Cited

U.S. PATENT DOCUMENTS

| 6,553,347 | B1 | 4/2003 | Tavor et al. |
| 7,027,975 | B1 | 4/2006 | Pazandak et al. |
| 7,177,798 | B2 | 2/2007 | Hsu et al. |
| 7,246,014 | B2 | 7/2007 | Forth et al. |

(Continued)

OTHER PUBLICATIONS

Office Action received in Mexican Counterpart Application MX/a/2014/003226 dated Apr. 10, 2017, 4 pgs. This Office Action alleges unpatentable subject matter and lack of novelty in view of U.S. Patent Appl. No. 2006/277103 to Fujita.

(Continued)

*Primary Examiner* — Anand Loharikar
(74) *Attorney, Agent, or Firm* — Greenberg Traurig, LLP

(57) ABSTRACT

A method of operating a price estimation system includes obtaining service requests from consumers, and obtaining bids from service professionals based on the service requests obtained from the consumers. The method additionally includes generating a training set based on the bids and the service requests, and generating a model for generating price estimates based on the training set. The method also includes employing the model to generate the price estimates based on additional service requests provided by additional consumers. In some aspects, the method further includes communicating the price estimates to the additional consumers during performance of a process for obtaining the additional service requests from the additional consumers. In other aspects, the method further includes communicating the price estimates to additional service professionals during performance of a process for obtaining additional bids from the additional service professionals based on the additional service requests.

20 Claims, 18 Drawing Sheets

(56) References Cited

U.S. PATENT DOCUMENTS

| | | |
|---|---|---|
| 7,310,642 B2 | 12/2007 | Mcconnell et al. |
| 7,949,529 B2 | 5/2011 | Weider et al. |
| 2002/0174081 A1 | 11/2002 | Charbonneau et al. |
| 2005/0165642 A1 | 7/2005 | Brouze et al. |
| 2010/0235378 A1 | 9/2010 | Armstrong et al. |
| 2012/0072441 A1 | 3/2012 | True |
| 2012/0179710 A1 | 7/2012 | Hanai |
| 2012/0203708 A1 | 8/2012 | Psota et al. |
| 2012/0254063 A1 | 10/2012 | Ritterman et al. |
| 2012/0254143 A1 | 10/2012 | Varma et al. |
| 2012/0290908 A1 | 11/2012 | Kumar et al. |
| 2012/0323950 A1 | 12/2012 | Wilson et al. |
| 2013/0218687 A1 | 8/2013 | Sohangir et al. |

OTHER PUBLICATIONS

Wang, J.: "Examine Two Recommendation and Optimization Problems in Online Advertising", Doctoral Dissertations, University of Connecticut, (2010), (Abstract).

Chubak, P.: "Relational databases for querying natural language text", M. Sc. Thesis, University of Alberta, (2007), pp. 1-77.

PRICE ESTIMATION SYSTEM

CROSS-REFERENCE TO RELATED APPLICATION

This application is a divisional of and claims priority to U.S. patent application Ser. No. 13/837,342 (now granted as U.S. Pat. No. 10,453,103), the disclosure of which is incorporated by reference herein in its entirety.

TECHNICAL FIELD

This disclosure is generally directed to price estimation systems. This disclosure is specifically directed to a price estimation system integrated with a service request system.

BACKGROUND

Consumers often hire service providers to perform tasks. For example, a consumer might hire a plumber to fix a leaking faucet or a general contractor to construct and install kitchen cabinets. In general, a service provider is any person, company, organization, or other entity that offers services to consumers. A service provider may provide only services, or provide services in conjunction with goods, such as a contractor that installs cabinets or a plumber that replaces pipes. A consumer may refer to any entity that requests a service from a service provider, including individual users, companies, organizations and government agencies.

Previously, consumers searching for service providers have utilized telephone directories, lists of recommended businesses from professional organizations, such as the Chamber of Commerce or the Better Business Bureau, or word-of-mouth recommendations from friends, family, colleagues, and business associates. More recently, online versions of these types of directories have become available.

Three broad categories of online local search have emerged to date. The first major category of online local search is the online directory, which are web sites or electronic equivalents of telephone directories and other types of business directories. These online directories typically include features such as searching or browsing by key words or categories. Electronic directories are most useful when consumers already have a business category or business name in mind.

The second major category of online local search is rating and review web sites, which are analogous to lists of recommended businesses and word-of-mouth recommendations. These web sites provide editor-generated or user-generated ratings and reviews of businesses, which act as a form of decision support for consumers who generally do not have first-hand familiarity with the business but want to gauge the quality of their services to determine if they want to become a consumer.

The third major category of online local search is lead generation sites. These sites accept requests for services from consumers and broker them out to potential service providers. The service providers must then contact the interested consumers directly to attempt to win their business.

These systems fail to meet numerous consumer needs. For example, consumers often do not know the proper name of the service category or the occupation of the person needed to complete a given task. In these cases, the local search options available today provide little value because the consumer lacks the knowledge required to perform an effective search. Additionally, many consumers have specific time and/or location requirements for services. These consumers typically must generate a list of potential service providers and then contact each one of them individually to determine their availability. Also, consumers often struggle to decide which service provider to choose when faced with many possibilities, but online ratings and reviews left by other consumers suffer from a high number of false or biased ratings. Further, consumers do not have a reliable way of knowing what to expect in terms of pricing for services, nor how specific details relating to a requested service will likely effect the ultimate price of the service.

BRIEF SUMMARY

In some aspects, a method of operating a price estimation system includes obtaining service requests from consumers, and obtaining bids from service professionals based on the service requests obtained from the consumers. The method additionally includes generating a training set based on the bids and the service requests, and generating a model for generating price estimates based on the training set. The method also includes employing the model to generate the price estimates based on additional service requests provided by additional consumers. In some aspects, the method further includes communicating the price estimates to the additional consumers during performance of a process for obtaining the additional service requests from the additional consumers. In other aspects, the method further includes communicating the price estimates to additional service professionals during performance of a process for obtaining additional bids from the additional service professionals based on the additional service requests.

In other aspects, a price estimation system includes a memory, and a processor coupled to the memory. For example, the processor is configured to obtain service requests from consumers, and obtain bids from service professionals based on the service requests obtained from the consumers. Additionally, the processor is configured to generate a training set based on the bids and the service requests, and generate a model for generating price estimates based on the training set. Also, the processor is configured to employ the model to generate price estimates based on additional service requests provided by additional consumers. In some aspects, the processor is further configured to communicate the price estimates to the additional consumers during performance of a process for obtaining the additional service requests from the additional consumers. In other aspects, the processor is further configured to communicate the price estimates to additional service professionals during performance of a process for obtaining additional bids from the additional service professionals based on the additional service requests.

In additional aspects, a non-transitory computer-readable medium includes code executable by a computer to obtain service requests from consumers, and code executable by a computer to obtain bids from service professionals based on the service requests obtained from the consumers. The non-transitory computer-readable medium additionally includes code executable by a computer to generate a training set based on the bids and the service requests, and code executable by a computer to generate a model for generating price estimates based on the training set. The non-transitory computer-readable medium additionally includes code executable by a computer to employ the model to generate price estimates based on additional service requests provided by additional consumers. In some aspects, the non-transitory computer-readable medium further includes code executable by a computer to communicate the price estimates to the additional consumers during performance of a process for obtaining the additional service requests from the additional consumers. In other aspects, the non-transitory computer-readable medium further includes code executable by a computer to communicate the price estimates to additional service professionals during performance of a process for obtaining additional bids from the additional service professionals based on the additional service requests.

In further aspects, a method of operation for a price estimation system includes employing a model to generate price estimates based on service requests provided by the consumers. In some aspects, the method includes communicating the price estimates to the consumers during performance of a process for obtaining the service requests from the consumers. In other aspects, the method includes communicating the price estimates to service professionals during performance of a process for obtaining bids from the additional service professionals based on the service requests.

In still other aspects, a price estimation system includes a memory and a processor coupled to the memory. The processor is configured to employ a model to generate price estimates based on service requests provided by the consumers. In some aspects, the processor is further configured to communicate the price estimates to the consumers during performance of a process for obtaining the service requests from the consumers. In other aspects, the processor is further configured to communicate the price estimates to service professionals during performance of a process for obtaining bids from the additional service professionals based on the service requests.

In still additional aspects, a non-transitory computer-readable medium includes code executable by a computer to employ a model to generate price estimates based on service requests provided by the consumers. In some aspects, the non-transitory computer-readable medium includes code executable by a computer to communicate the price estimates to the consumers during performance of a process for obtaining the service requests from the consumers. In some aspects, the non-transitory computer-readable medium includes code executable by a computer to communicate the price estimates to service professionals during performance of a process for obtaining bids from the additional service professionals based on the service requests.

In still further aspects, a method of generating a model for generating price estimates includes generating the model for generating price estimates based on a training set. The training set is generated by retrieving data corresponding to service requests obtained from consumers. The training set is additionally generated by retrieving data corresponding to bids obtained from service professionals based on the service requests obtained from the consumers. The training set is also generated by generating the training set based on the data representing the bids and the data representing service requests.

In yet other aspects, a system for generating a model for generating price estimates includes a memory, and a processor coupled to the memory. The processor is configured to generate the model for generating price estimates based on a training set. The training set is generated by retrieving data corresponding to service requests obtained from consumers. The training set is additionally generated by retrieving data corresponding to bids obtained from service professionals based on the service requests obtained from the consumers. The training set is also generated by generating the training set based on the data representing the bids and the data representing service requests.

In yet additional aspects, a non-transitory computer-readable medium includes code executable by a computer to generate a model for generating price estimates based on a training set. The training set is generated by retrieving data corresponding to service requests obtained from consumers. The training set is additionally generated by retrieving data corresponding to bids obtained from service professionals based on the service requests obtained from the consumers. The training set is also generated by generating the training set based on the data representing the bids and the data representing service requests.

In yet further aspects, a method of generating a training set for use in generating a model for generating price estimates includes retrieving data corresponding to service requests obtained from consumers. The method additionally includes retrieving data corresponding to bids obtained from service professionals based on the service requests obtained from the consumers. The method also includes generating the training set based on the data representing the bids and the data representing service requests.

In even other aspects, a system for generating a training set for use in generating a model for generating price estimates includes a memory, and a processor coupled to the memory. The processor is configured to, the processor configured to retrieve data corresponding to service requests obtained from consumers. The processor is additionally configured to retrieve data corresponding to bids obtained from service professionals based on the service requests obtained from the consumers. The processor is further configured to generate the training set based on the data representing the bids and the data representing service requests.

In even further aspects, a non-transitory computer-readable medium includes code executable by a computer to retrieve data corresponding to service requests obtained from consumers. The non-transitory computer-readable medium additionally includes code executable by a computer to retrieve data corresponding to bids obtained from service professionals based on the service requests obtained from the consumers. The non-transitory computer-readable medium also includes code executable by a computer to generate the training set based on the data representing the bids and the data representing service requests.

The term "coupled" is defined as connected, although not necessarily directly, and not necessarily mechanically. The terms "a" and "an" are defined as one or more unless this disclosure explicitly requires otherwise.

The terms "detect" (and any form of detect, such as "detects," "detected," and "detecting") and "determine" (and any form of determine, such as "determines," "determined," and "determining") are used broadly throughout this disclosure to include receiving information, obtaining or gathering of information, and any calculations for and/or manipulations of such information that may result in additional information. Such terms should include terms such as measuring, identifying, receiving, obtaining, gathering, similar terms, and derivatives of such terms.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or system that "comprises," "has," "includes" or "contains" one or more steps or elements possesses those one or more steps or elements, but is not limited to possessing only those one or more elements. Likewise, a step of a method or an element or component of a system that "comprises," "has," "includes" or "contains" one or more features possesses those one or more features, but is not limited to possessing only those one or more features. Additionally, terms such as "first" and "second" are used only to differentiate structures or features, and not to limit the different structures or features to a particular order.

Furthermore, a device or structure (such as a processor) that is configured in a certain way is configured in at least that way, but may also be configured in ways that are not listed.

The feature or features of one embodiment may be applied to other embodiments, even though not described or illustrated, unless expressly prohibited by this disclosure or the nature of the embodiments.

Any embodiment of any of the disclosed systems, methods, and non-transitory computer readable media can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures illustrate at least some of the described elements using graphical symbols that will be understood by those of ordinary skill in the art, in which.

DETAILED DESCRIPTION

Concepts of the present disclosure utilize a price estimator integrated with a service request system. Advantageously, a model trained on bid data for previous service requests is utilized to generate price estimates based on partially completed service requests, such that an updated price estimate may be generated and displayed to the consumer during the service request definition activity. Accordingly, consumers may readily appreciate the impact of their selections on their price estimate during service request activity, and revise their selections and/or service request accordingly.

Figure 1:
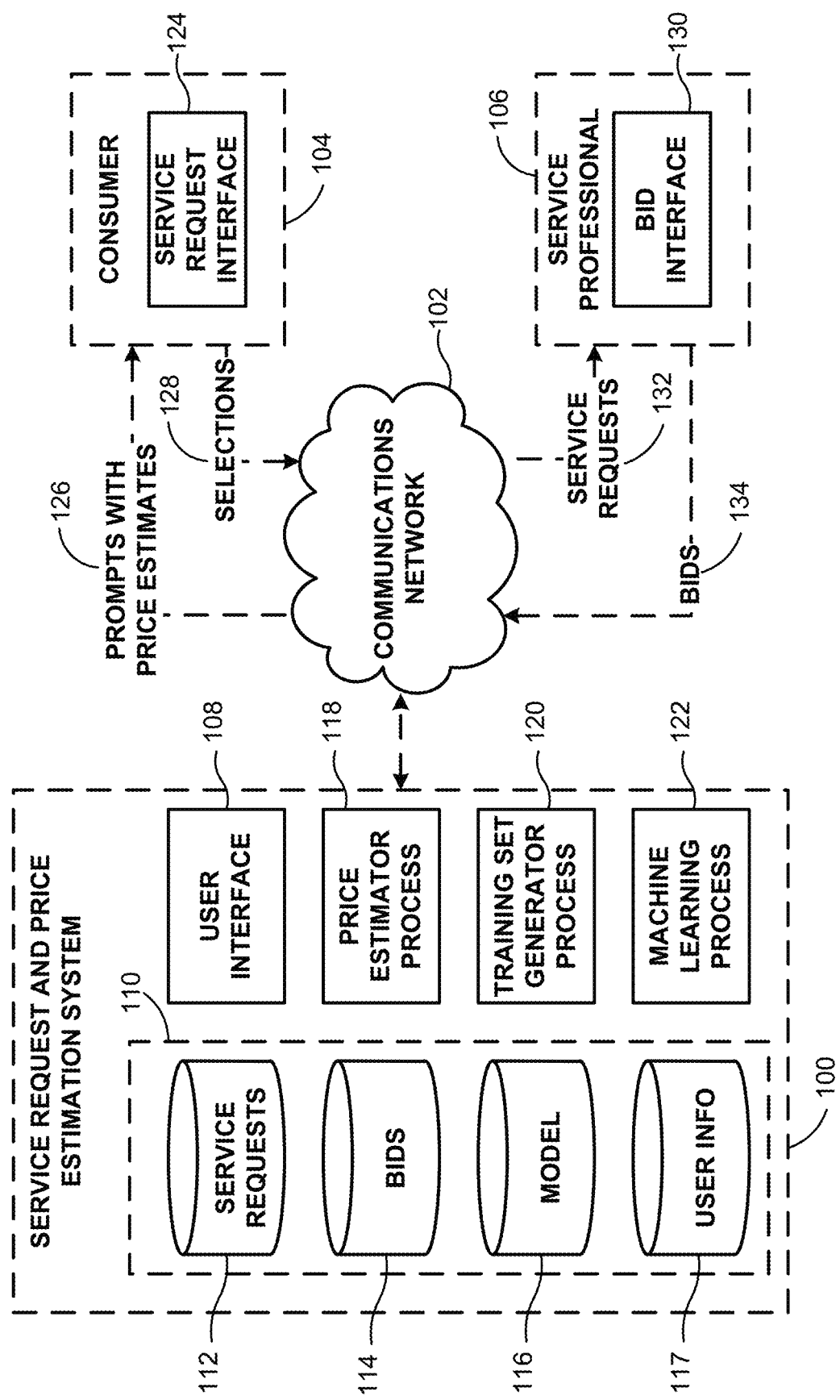
FIG. 1 is a block diagram illustrating a price estimation system in accordance with one aspect of the present disclosure.

Referring to FIG. 1, a price estimation system 100 may be integrated with a service request system implemented with one or more computer processors operatively connected to a communications network 102, such as the Internet, a cellular network, and/or any other suitable type of communications network. The one or more computer processors of system 100 may be equipped with network interfaces, wireless radios, and/or any other type of mechanism enabling communication, via communications network 102, with consumer machines 104 and service professional machines 106. It is envisioned that the consumer machines 104 and service professional machines 106 may be personal computers, smart phones, tablets, or any other type of machine employed to access information over communications network 102.

The term "processor" is used generally throughout this disclosure to describe any device capable of performing one or more functions described in this disclosure. For example, the functions may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In some aspects, price estimation system 100 may have a user interface 108 that is operable to interface with the consumer machines 104 and service professional machines 106 over communications network 102. In some implementations, the user interface 108 may include one or more client applications that may be served to the consumer machines 104 and service professional machines 106 over communications network 102. In other implementations, user interface may operate according to a peer to peer communications protocol, or any other communications protocol suitable for interaction with consumer machines 104 and service professional machines 106 over communications network 102.

In additional or alternative aspects, price estimation system 100 may have one or more computer readable media, such as a computer memory or any other type of medium capable of recording data and/or machine code instructions. The computer readable media may have a data region 110 recording data including service requests 112, bids 114, a model 116 for estimating prices based on service requests, and/or user info 117, such as information on consumers and service professionals. In these aspects, the computer-readable media may additionally record machine code instructions configuring the one or more computer processors to implement the user interface 108, a price estimator process 118, a training set generator process 120, and/or a machine learning process 122.

In operation, price estimation system 100 may be operatively connected to communicate, via user interface 108 over communications network 102, with consumer machines 104 to implement a service request interface 124. The service request interface 124 may be configured to communicate prompts with price estimates 126 to consumers via the consumer machines 104, and receive consumer selections 128 in response to the prompts. In some implementations, user interface 108 may receive the selections 128 over communications network 102, and utilize price estimator process 118 with model 116 to generate a price estimate based on the selections 128 received thus far. Then user interface 108 may select a next prompt based on previously received selections 128, and communicate the next prompt with the price estimate 126 to the consumer machines 104 over the communications network 102. Alternatively, it is envisioned that model 116 and price estimator process 118 may be delivered to the consumer machine 104 as part of service request interface 124, and thus configure the consumer machine 104 to operate as the price estimation system 100. According to this alternative, service request interface 124 may be configured to transmit completed service requests over communications network 102 to the one or more processors for storage as service requests 112. Alternatively or additionally, service request interface may transmit completed service requests 132 directly to service professional machines 106.

In some implementations, price estimation system may be operatively connected to communicate, via user interface 108 over communications network 102, with service professional machines 106 to implement a bid interface 130. The bid interface 130 may be configured to communicate service requests 132 to service professionals via the service professional machines 106, and receive bids 134 in response to the service requests 132. In some implementations, user interface 108 may receive the bids 134 from the service professional machines 106 over communications network 102, and record the received bid data as the bids 114. Alternatively or additionally, user interface 108 may utilize price estimator process 118 with model 116 to generate a price estimate based on the service request 132 for which a bid is solicited. It is envisioned that the user interface 108 may transmit this price estimate to the service professional machine 106, either before or after receiving the bid 134. Alternatively, it is envisioned that the user interface 108 may compare the received bid 134 to the price estimate to determine if the price estimate is out of range, and then transmit results of the comparison to the service professional machine 106. The results of the comparison may alternatively or additionally be transmitted to the consumer machine 104, and/or stored for purposes of rating professionals. Alternatively, it is envisioned that model 116 and price estimator process 118 may be delivered to the service professional machine 106 as part of bid interface 130, and thus configure the service professional machine 106 to operate as the price estimation system 100 as described above. It is additionally envisioned that bid interface 130 may be configured to transmit bids 134 over communications network 102 directly to consumer machines 104.

Given the operations described above, it should be readily understood that model 116 is useful for generating price estimates based on consumer selections received during performance of a process for obtaining further service requests from consumers. It should additionally be readily understood that the model 116 may be useful for generating price estimates based on completed service requests. In some implementations, price estimation system 100 may utilize training set generator process 120 to generate a training set based on bids 114 and service requests 112, and possibly user info 117 (i.e. characteristics of the user making the service request, and/or the pro making the bid). Then, price estimation system 100 may utilize machine learning process 122 to generate the model 116 from the training set. A model 116 may be generated just once, periodically, or continuously. Each model may be constructed from different subsets of the complete historical record of service request bids 114.

It should be understood that, in some implementations, training set generator process 120 and machine learning process 122 may not be present in the price estimation system 100. For example, one or more "apps" may be developed that contain a previously trained model 116 and a price estimator 118, and at least one of the service request interface 124 or the bid interface 130. Such an "app" may be installed by a consumer or a service professional on the consumer machine 104 or the service professional machine 106, such as a smartphone or tablet, and the "app" having the built in model may enable price estimates to be generated even when operating offline. Other implementations will also be readily apparent to one skilled in the art.

Figure 2:
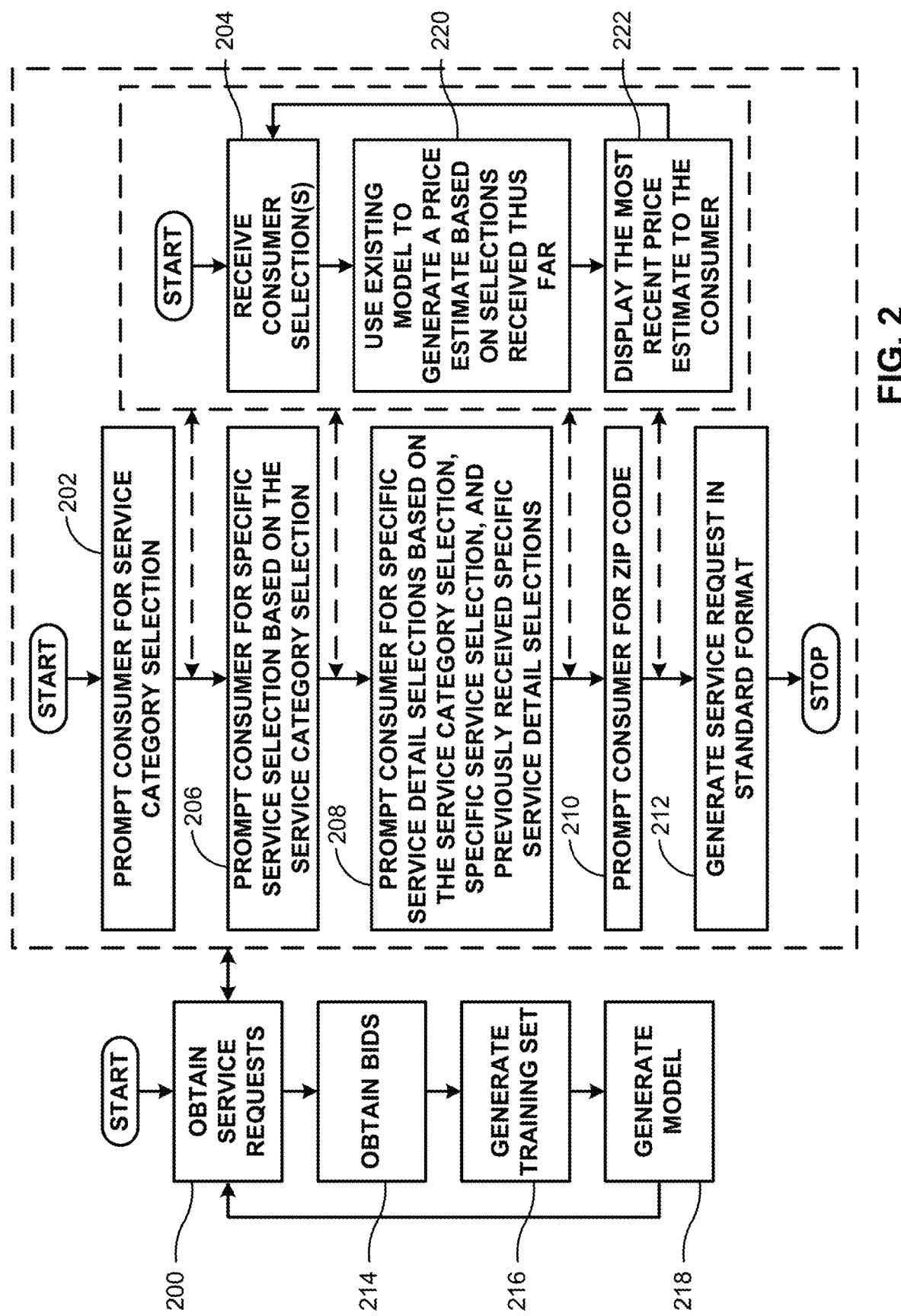
FIG. 2 is a flow diagram illustrating a method of operation for a price estimation system in accordance with one aspect of the present disclosure.

FIG. 2 is a flow diagram illustrating a method of operation for a price estimation system in accordance with one aspect of the present disclosure. Beginning at step 200, service requests are obtained from consumers. For example, at step 202, the consumer may be prompted to make a service category selection, and a consumer selection indicating the service category selection may be received at step 204. In response to receipt of the service category selection, the consumer may be prompted, at step 206, to make a specific service selection based on the service category selection, and a consumer selection indicating the specific service selection may be received at step 204. It is envisioned that a consumer may be prompted, at step 202, to make a specific service selection, and that the service category selection may be inferred from the specific service selection. Therefore, step 202 may not be performed, and step 206 may not be in response to receipt of a service category selection. In response to receipt of the specific service selection, the consumer may be prompted, at step 208, to make one or more specific service detail selections based on the service category selection and the specific service selection, and consumer selections indicating the specific service detail selection may be received at step 204.

In response to receipt of specific service detail selections, steps 208 and 204 may be repeated until no more specific service details are required. For example, graph data structures may be employed to constrain the set of prompts that may subsequently be shown to the consumer on the basis of prompt selections already made by the consumer. Therefore, prompting the consumer to make one or more task detail selections, at step 208, may be further based on any previously received task detail selections made by the consumer. In response to completion of step 208, the consumer may be prompted, at step 210, to supply zip code information, and a consumer selection indicating the zip code information may be received at step 204. It is also envisioned that the consumer may be permitted to add notes the service request, in free-form text, and that elements derived from this text may be used in a training set as described below. Then, upon submission of the all of the service request selections, a completed service request may be generated in a standard format, at step 212, and stored in a database. Processing proceeds from step 200 to step 214.

At step 214, bids are obtained from service professionals based on the service requests obtained from the consumers. For example, service request information in text format may be communicated to service professionals located in or near the zip code selected by the consumer in generating the service request. Additionally, bids may be received from the service professionals in the form of a flat rate quote, a range quote, or an onsite required indication, meaning the service professional does not have enough information. These bids may be stored in a database in association with the service requests for which they were made. Processing may proceed from step 214 to step 216.

At step 216, a training set may be generated based on the bids and the service requests. For example, generating the training set may include evaluating, for service requests R, bid data B(R) according to the following pseudocode:

```
training_set = [ ]
for each service request R in the database:
    for each bid b in B(R):
        training_set += [(R, b)].
```

Additionally, it is envisioned that seasonality may be added as an element to training_set. For example, a yard cleanup specific service may prove generally more expensive in the Fall than during other seasons. Adding the season to training_set (e.g., corresponding to time of the service request) may produce models that can better reflect such nuances. As another alternative, generating the training set may include evaluating, for service requests R, bid data B(R), characteristics of a consumer U(R) making a request R, and characteristics of a service professional P(b) making the bid b according to the following pseudocode:

```
training_set = [ ]
for each service request R in the database:
    for each bid b in B(R):
        training_set += [(R, U(R), b, P(b))].
```

The resulting training_set may be stored in a computer readable medium. Processing may proceed from step 216 to step 218.

At step 218, a model for generating price estimates based on consumer selections may be generated and stored in a computer-readable medium. For example, generating the model to generate price estimates may include employing a machine learning algorithm on training_set to obtain a model M such that M(R) approximates b. Alternatively or additionally, generating the model to generate price estimates may include employing a machine learning algorithm on training_set to obtain a model M such that M(R, U(R)) approximates (b, P(b)). However, it should be understood that any kind of machine learning algorithm may be employed in accordance with the present disclosure. For example, it is envisioned that linear regression, decision trees, combinations thereof, or any other suitable type of machine learning algorithm may be used. Processing may return from step 218 to step 200.

Upon return to step 200, the model may be employed, at step 220, to generate price estimates based on the consumer selections received, at step 204, during the performance of a process for obtaining the further service requests from the consumers. It is envisioned that step 220 may include performing generation of a new price estimate upon receipt of each of the service category selection, the specific service selection, and the one or more specific service detail selections. The price estimates may be communicated, at step 222, to the consumers during the performance of the process for obtaining further service requests from the consumers. For example, communicating the price estimates to the consumers may include displaying each new price estimate to the consumer upon generation thereof. Accordingly, a consumer may readily appreciate a likely price range for the service, and the impact of selections on the price estimate. This capability may allow the consumer to explore various options, immediately view the impact on the price estimate that is caused by selecting individual options, and immediately decide whether to include the options in the service request. Processing may again proceed from step 200 to step 214.

Upon return to step 214, a price estimate may be generated based on the service request information. This price estimate may be communicated to the service professionals with the service request information. Alternatively, the bids received from the service professionals may be compared to one or more thresholds associated with the price estimate to perform detection of one or more out of range bids, and the service professionals may be informed of the detection of the one or more out of range bids. One skilled in the art should readily understand that steps 216 and 218 may be performed again utilizing an online machine learning process, such as recursive least squares, or may be performed offline with a batch machine learning process.

Figure 3:
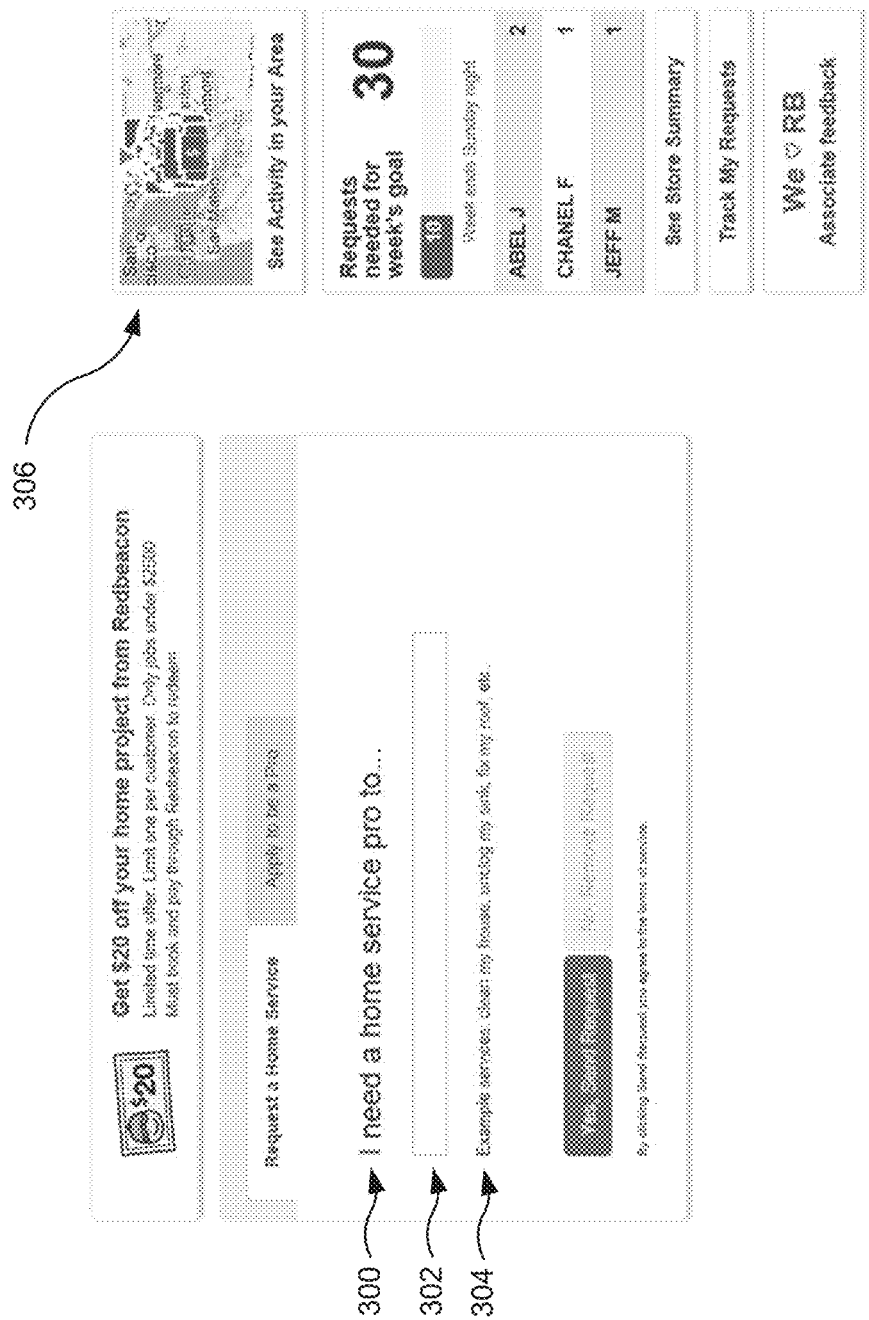
FIG. 3 is a graphical representation of a graphical user interface in an service category selection mode of operation in accordance with one aspect of the present disclosure.

FIG. 3 is a graphical representation of a graphical user interface in an service category selection mode of operation in accordance with one aspect of the present disclosure. For example, a prompt 300 may be displayed that encourages the consumer to describe the desired service in a natural language format in a text box 302. Additionally, hyperlinks 304 may be displayed describing example services, and that allow the consumer to select a service category and/or a specific service. It is envisioned that a service category selection may be inferred from a specific service selection. Additional controls 306 may include an interactive map allowing consumers to view activity in their area, a store summary, a tool for tracking the consumer's requests, and a tool for providing feedback.

Figure 4:
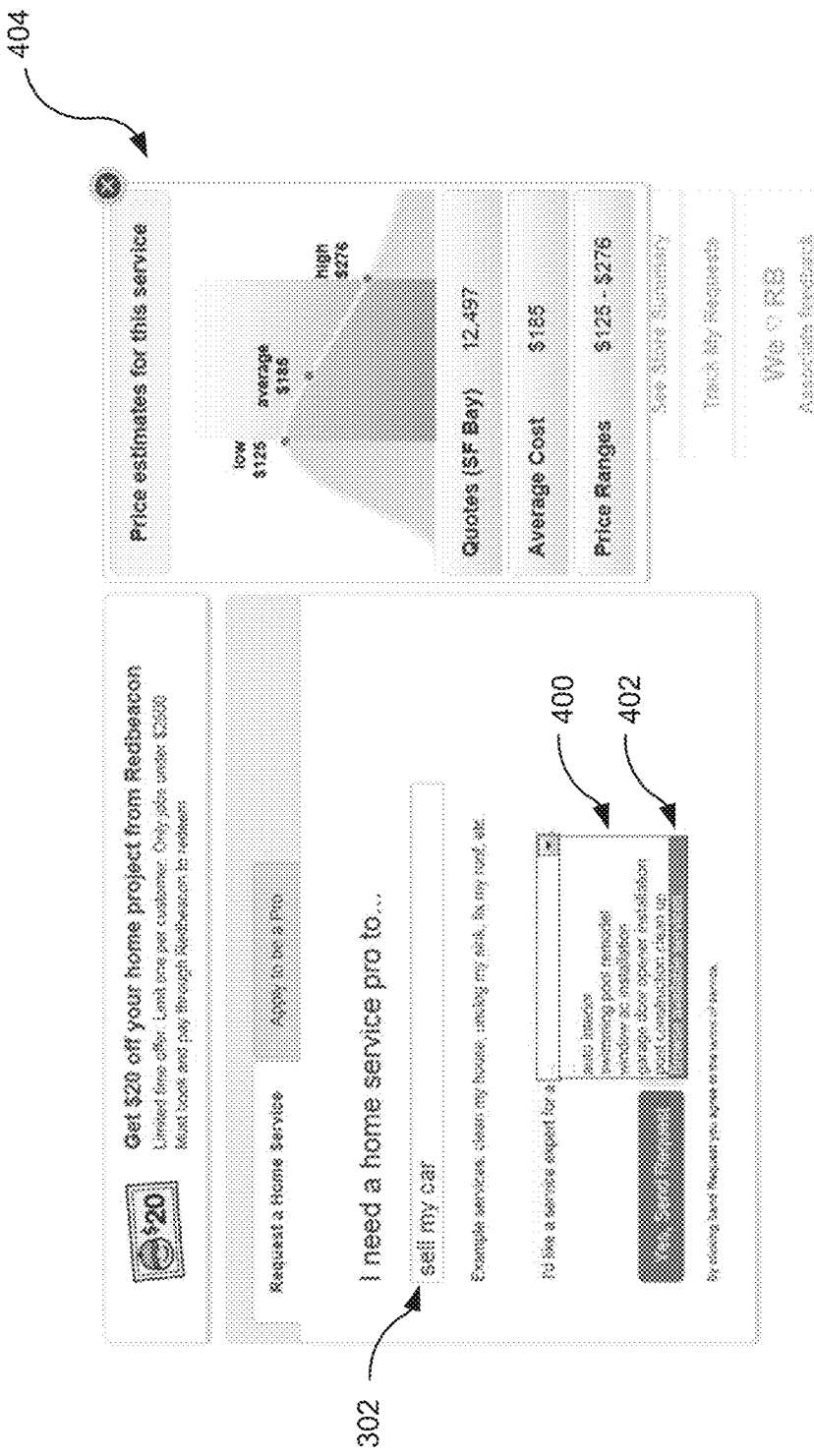
FIG. 4 is a graphical representation of a graphical user interface in another service category selection mode of operation in accordance with one aspect of the present disclosure.

FIG. 4 is a graphical representation of a graphical user interface in another service category selection mode of operation in accordance with one aspect of the present disclosure. For example, if a consumer enters text into the text box 302, then a drop down menu 400 of selectable specific services may be generated based on a key word search or other criteria. This drop down menu 400 may include a control 402 permitting the consumer to instead browse all available service categories. Additionally, a price estimate may be generated based on all of the selectable specific services and potentially matching service categories associated with the potential specific services. This price estimate may be displayed to the consumer, at 404, as a probability distribution including various statistics, which may include the average, median, or low and high price thresholds defined in terms of percentiles.

Figure 5:
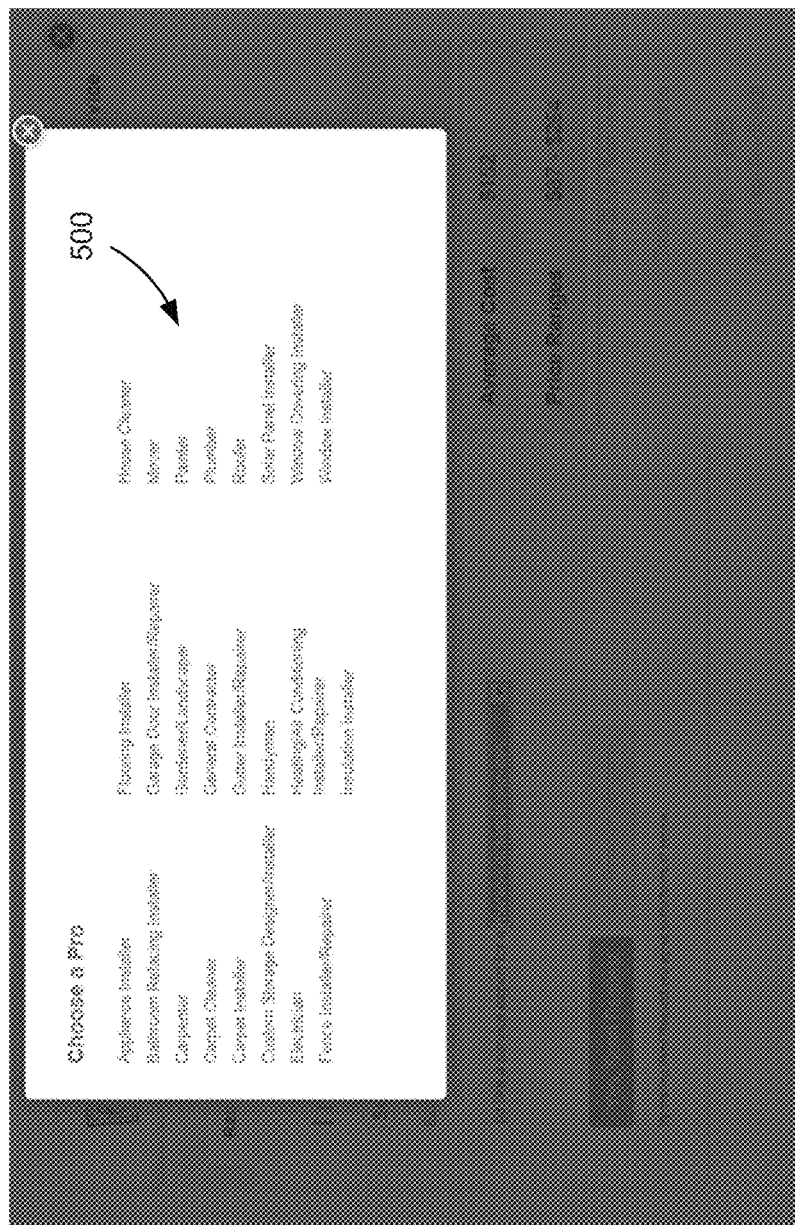
FIG. 5 is a graphical representation of a graphical user interface in a further service category selection mode of operation in accordance with one aspect of the present disclosure.

FIG. 5 is a graphical representation of a graphical user interface in a further service category selection mode of operation in accordance with one aspect of the present disclosure. For example, if a consumer selects to browse all available service categories, then a set of hyperlinks 500 containing text naming the service categories may be presented to the consumer. The consumer may make an service category selection by interacting with one of the hyperlinks corresponding to that service category.

Figure 6:
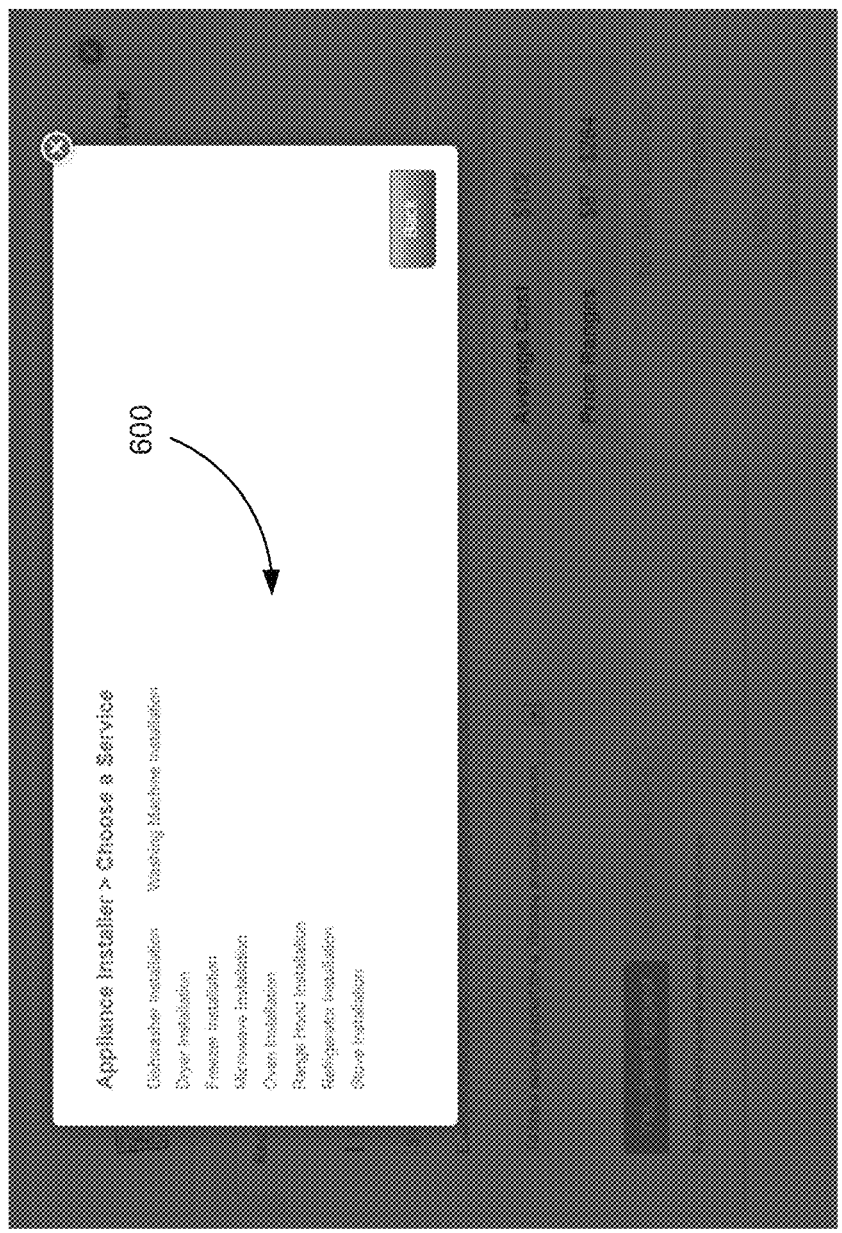
FIG. 6 is a graphical representation of a graphical user interface in a specific service selection mode of operation in accordance with one aspect of the present disclosure.

FIG. 6 is a graphical representation of a graphical user interface in a specific service selection mode of operation in accordance with one aspect of the present disclosure. For example, if the consumer selects an "appliance installer" service category, then a set of hyperlinks 600 containing text naming selectable specific services associated with the service category may be presented to the consumer. The consumer may then make a specific service selection by interacting with one of the hyperlinks corresponding to that specific service.

Figure 7:
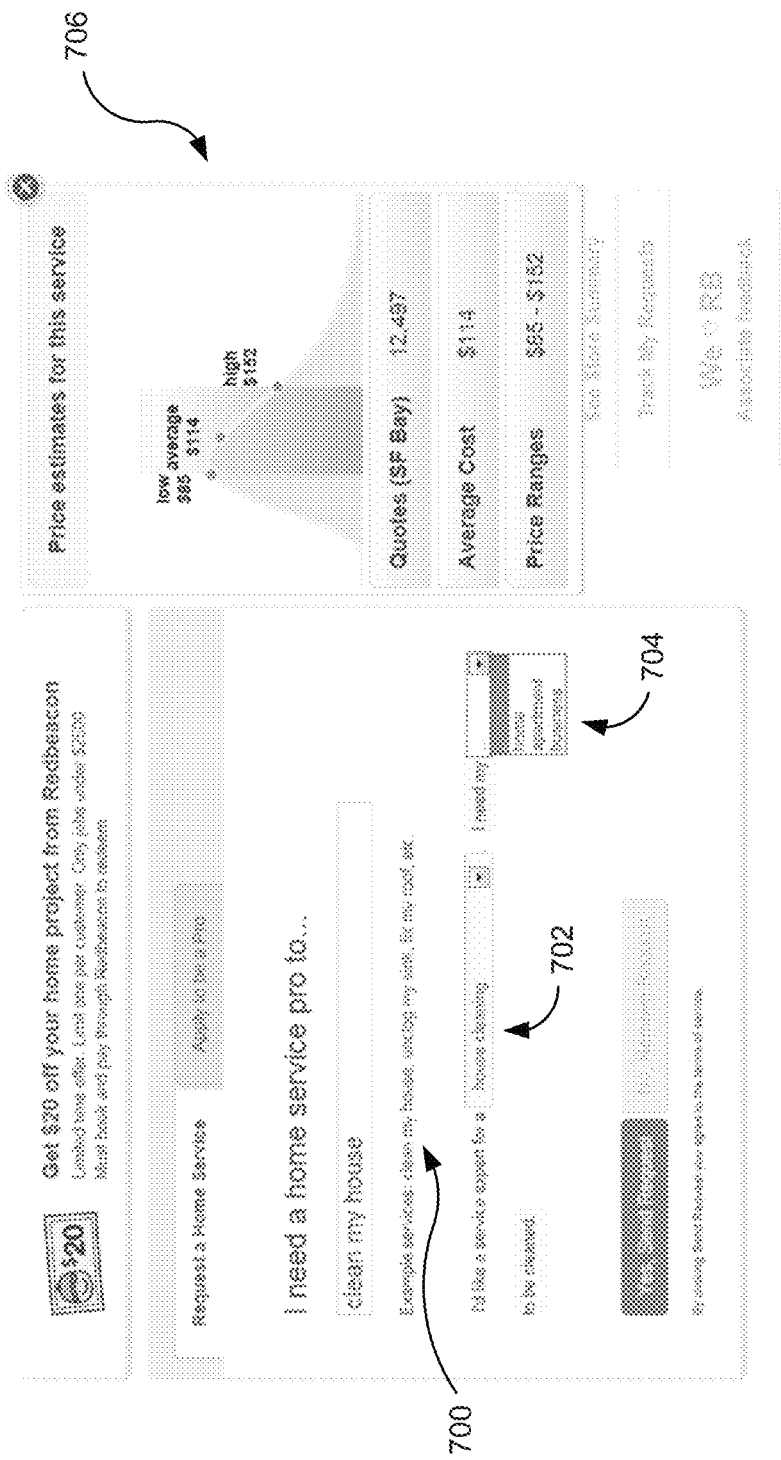
FIG. 7 is a graphical representation of a graphical user interface in a specific service detail selection mode of operation in accordance with one aspect of the present disclosure.

FIG. 7 is a graphical representation of a graphical user interface in a specific service detail selection mode of operation in accordance with one aspect of the present disclosure. For example, if the consumer makes a housecleaner service category selection by interacting with hyperlink 700, and makes a house cleaning specific service selection by interacting with drop down menu 702, then another drop down menu 704 may be generated. Based on the service category selection and the specific service selection, drop down menu 704 may prompt the consumer to select a type of dwelling (e.g., home, apartment, business) to be cleaned. Also an updated price estimate may be displayed at 706.

Figure 8:
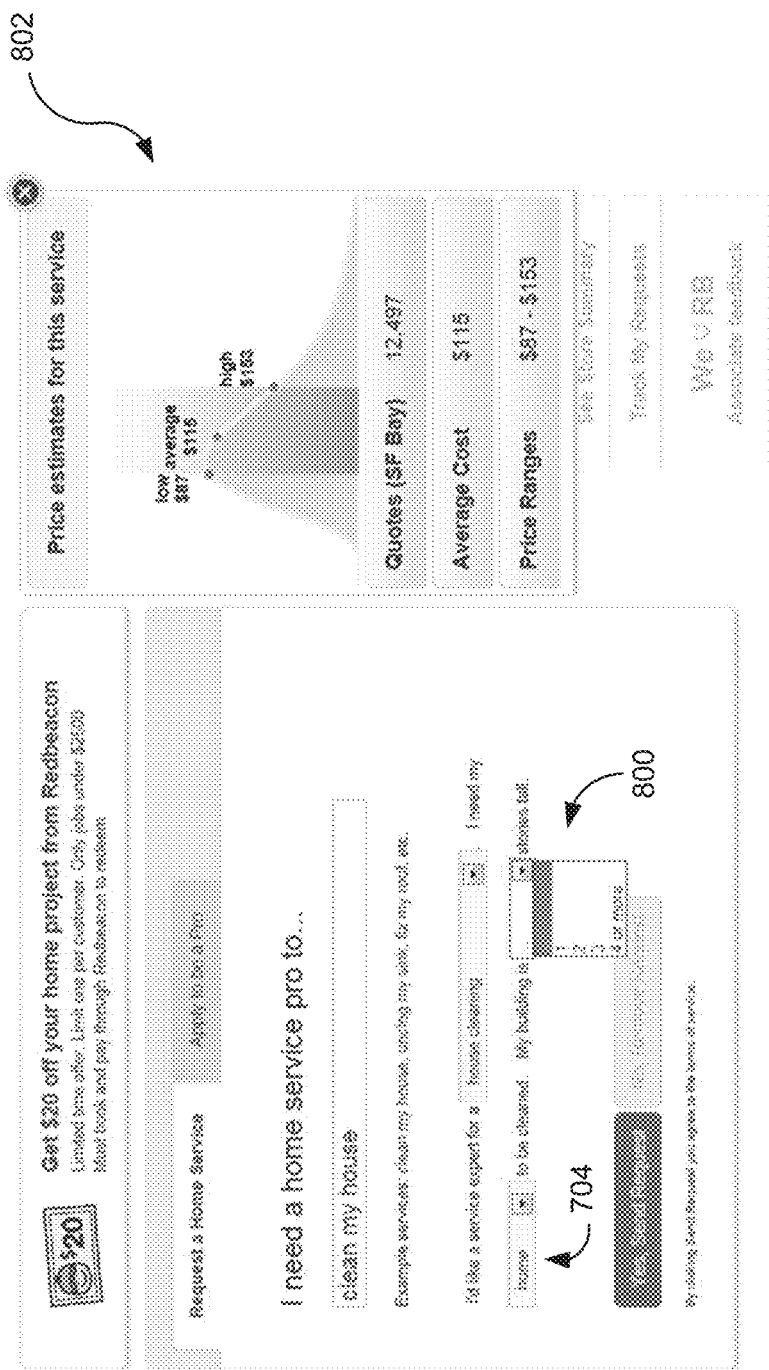
FIG. 8 is a graphical representation of a graphical user interface in another specific service detail selection mode of operation in accordance with one aspect of the present disclosure.

FIG. 8 is a graphical representation of a graphical user interface in another specific service detail selection mode of operation in accordance with one aspect of the present disclosure. For example, if the consumer makes a specific service detail selection, in drop down menu 704, indicating that a home is to be cleaned, then another drop down menu 800 may be generated. Based on the service category selection, the specific service selection, and the previous specific service detail selection, drop down menu 800 may prompt the consumer to make a selection indicating a number of stories of the home to be cleaned. Also an updated price estimate may be displayed at 802.

Figure 9:
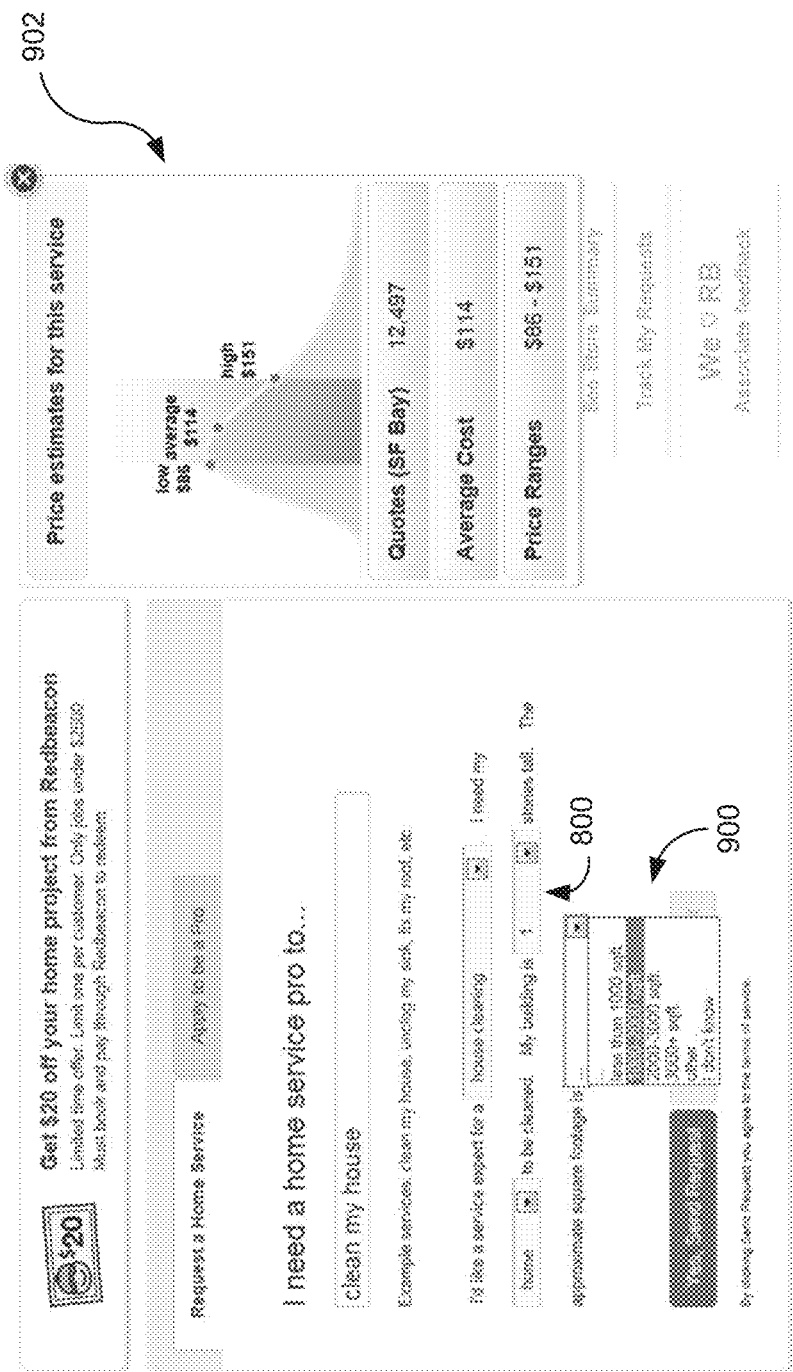
FIG. 9 is a graphical representation of a graphical user interface in an additional specific service detail selection mode of operation in accordance with one aspect of the present disclosure.

FIG. 9 is a graphical representation of a graphical user interface in an additional specific service detail selection mode of operation in accordance with one aspect of the present disclosure. For example, if the consumer makes a specific service detail selection, in drop down menu 800, indicating that the home to be cleaned has one story, then another drop down menu 900 may be generated. Based on the service category selection, the specific service selection, and the previous specific service detail selections, drop down menu 900 may prompt the consumer to make a selection indicating a square footage of the home to be cleaned. Also an updated price estimate may be displayed at 902.

Figure 10:
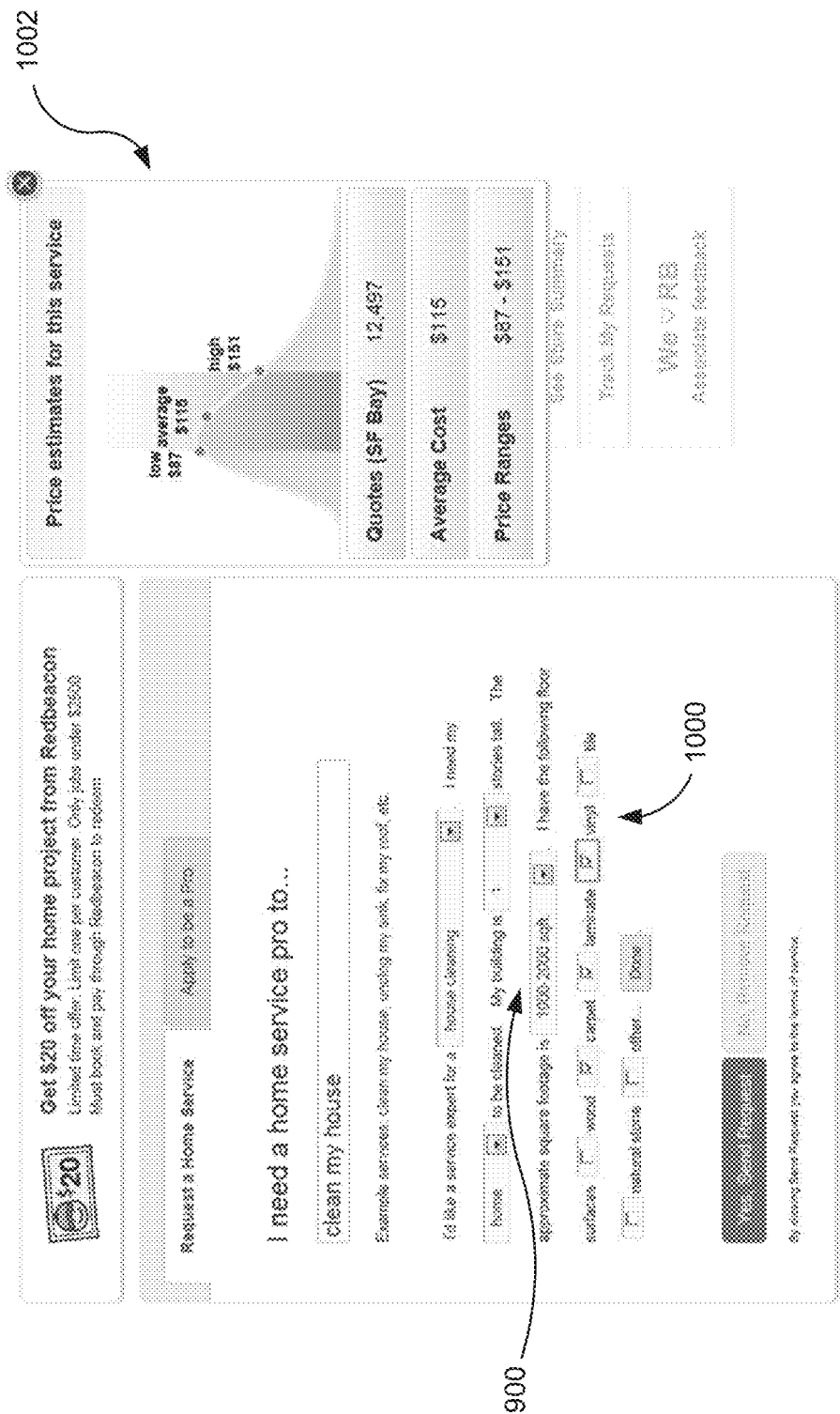
FIG. 10 is a graphical representation of a graphical user interface in a further specific service detail selection mode of operation in accordance with one aspect of the present disclosure.

FIG. 10 is a graphical representation of a graphical user interface in a further specific service detail selection mode of operation in accordance with one aspect of the present disclosure. For example, if the consumer makes a specific service detail selection, in drop down menu 900, indicating that the home to be cleaned is 1000-2000 square feet, then a set of labeled checkboxes 1000 may be generated. Based on the service category selection, the specific service selection, and the previous specific service detail selections, labeled checkboxes 1000 may prompt the consumer to make one or more selections indicating types of floor surfaces of the home to be cleaned. Also an updated price estimate may be displayed at 1002.

Figure 11:
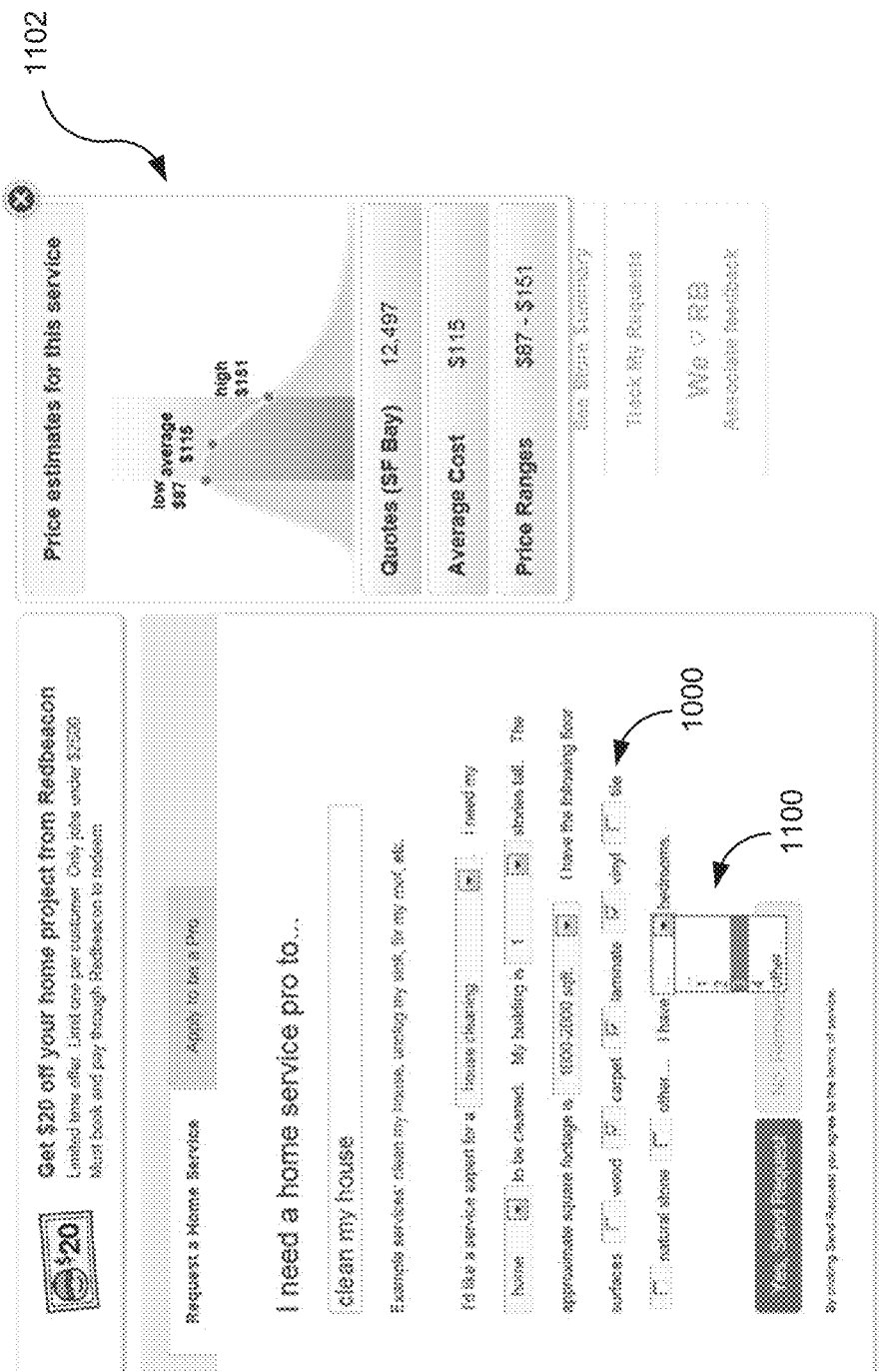
FIG. 11 is a graphical representation of a graphical user interface in yet another specific service detail selection mode of operation in accordance with one aspect of the present disclosure.

FIG. 11 is a graphical representation of a graphical user interface in yet another specific service detail selection mode of operation in accordance with one aspect of the present disclosure. For example, if the consumer makes specific service detail selections, in labeled checkboxes 1000, indicating that the home to be cleaned has carpet, laminate, and vinyl floor surfaces, then another drop down menu 1100 may be generated. Based on the service category selection, the specific service selection, and the previous specific service detail selections, drop down menu 1100 may prompt the consumer to make a selection indicating a number of bedrooms of the home to be cleaned. Also an updated price estimate may be displayed at 1102.

Figure 12:
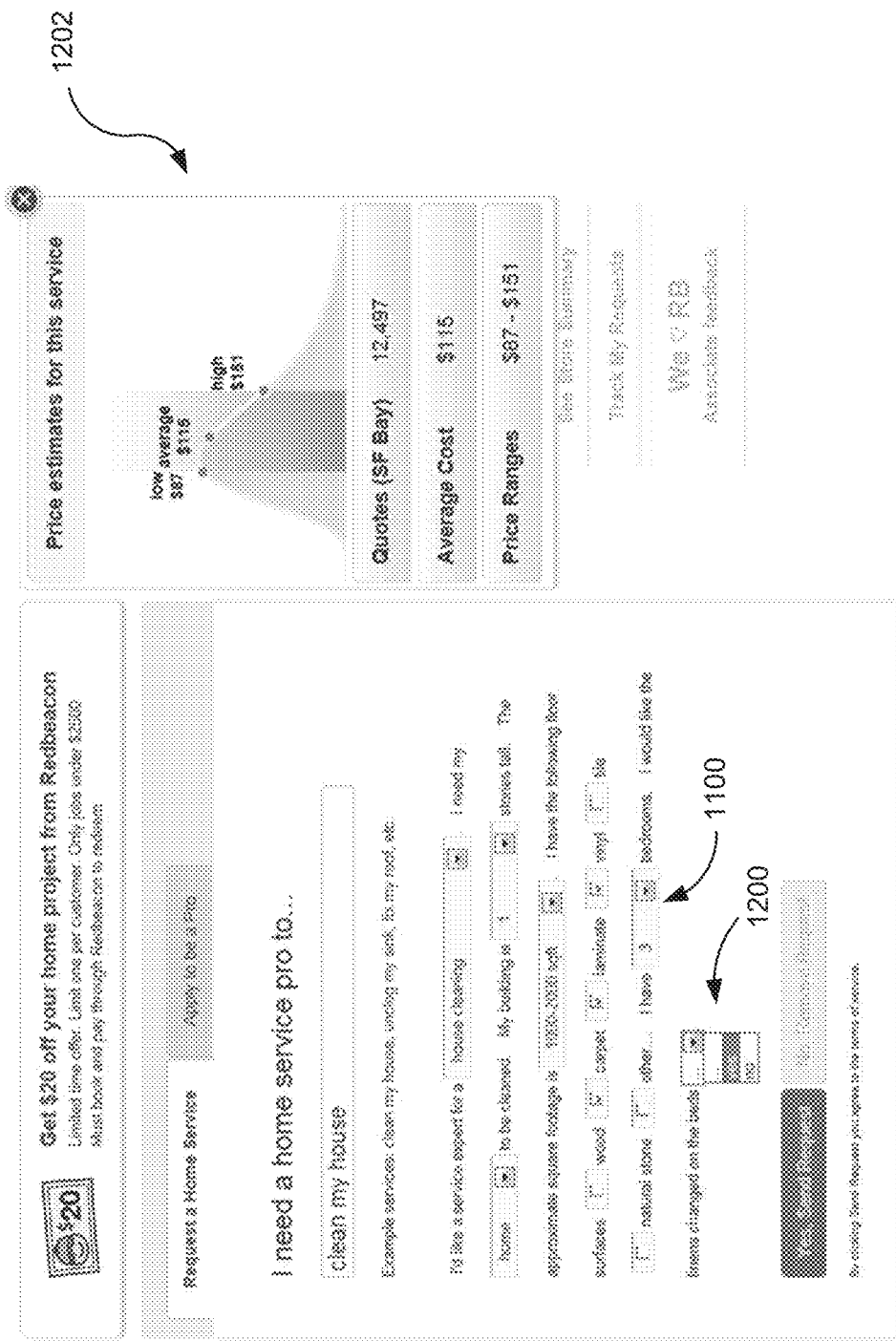
FIG. 12 is a graphical representation of a graphical user interface in yet an additional specific service detail selection mode of operation in accordance with one aspect of the present disclosure.

FIG. 12 is a graphical representation of a graphical user interface in yet an additional specific service detail selection mode of operation in accordance with one aspect of the present disclosure. For example, if the consumer makes a specific service detail selection, in drop down menu 1100, indicating that the home to be cleaned has three bedrooms, then another drop down menu 1200 may be generated. Based on the service category selection, the specific service selection, and the previous specific service detail selections, drop down menu 1200 may prompt the consumer to make a selection indicating whether linen changing service is desired. Also an updated price estimate may be displayed at 1202.

Figure 13:
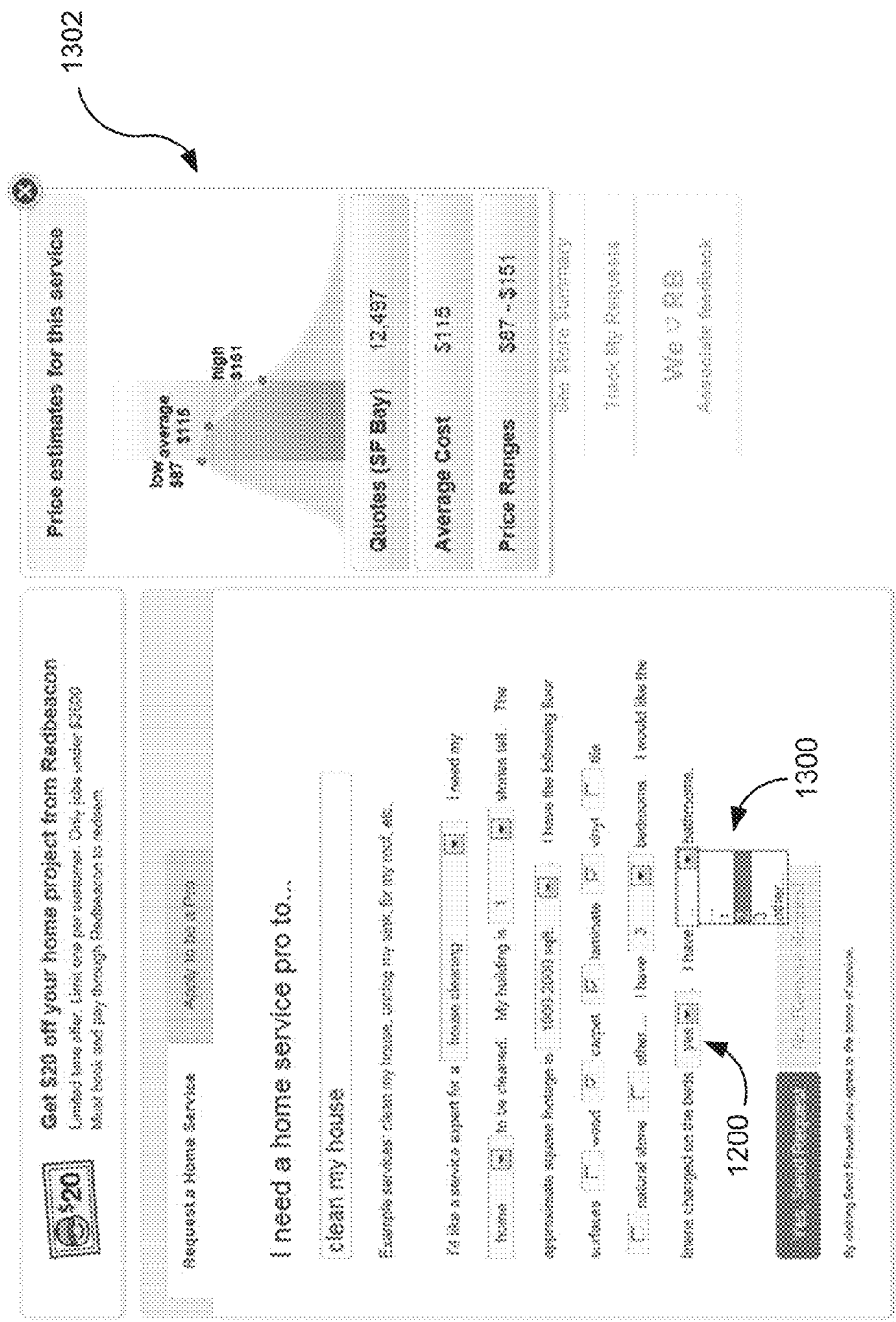
FIG. 13 is a graphical representation of a graphical user interface in yet a further specific service detail selection mode of operation in accordance with one aspect of the present disclosure.

FIG. 13 is a graphical representation of a graphical user interface in yet a further specific service detail selection mode of operation in accordance with one aspect of the present disclosure. For example, if the consumer makes a specific service detail selection, in drop down menu 1200, indicating that linen changing service is desired, then another drop down menu 1300 may be generated. Based on the service category selection, the specific service selection, and the previous specific service detail selections, drop down menu 1300 may prompt the consumer to make a selection indicating a number of bathrooms of the home to be cleaned. Also an updated price estimate may be displayed at 1302. The display of the price estimate at 1302 may occur immediately upon selection, by the consumer of the linen changing service option. Accordingly, the consumer can readily appreciate that selecting the linen changing service option is unlikely to affect the price of the requested service.

Figure 14:
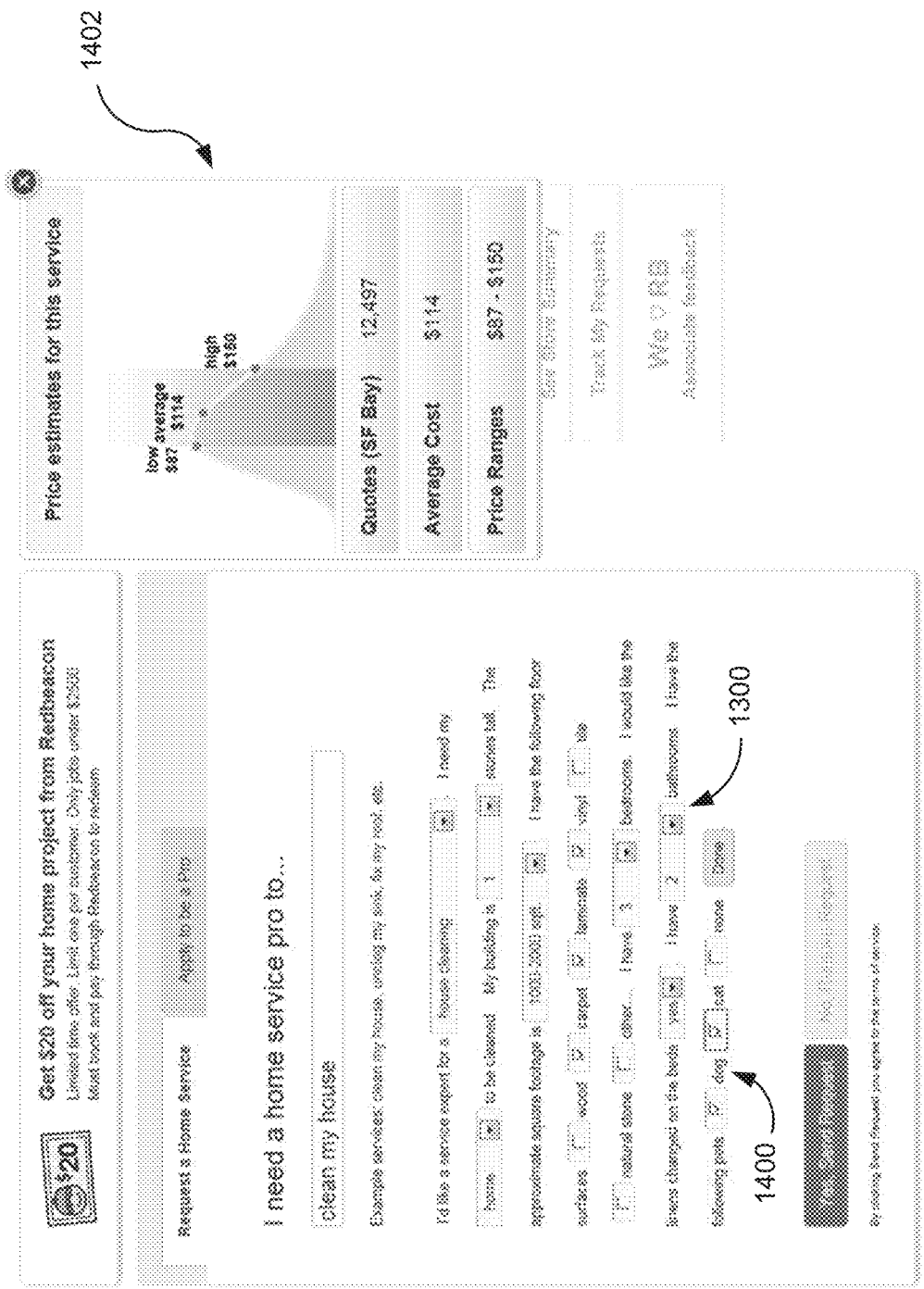
FIG. 14 is a graphical representation of a graphical user interface in still another specific service detail selection mode of operation in accordance with one aspect of the present disclosure.

FIG. 14 is a graphical representation of a graphical user interface in still another specific service detail selection mode of operation in accordance with one aspect of the present disclosure. For example, if the consumer makes a specific service detail selection, in drop down menu 1300, indicating that the home to be cleaned has two bathrooms, then a set of labeled checkboxes 1400 may be generated. Based on the service category selection, the specific service selection, and the previous specific service detail selections, labeled checkboxes 1400 may prompt the consumer to make one or more selections indicating types of pets living in the home to be cleaned. Also an updated price estimate may be displayed at 1402.

Figure 15:
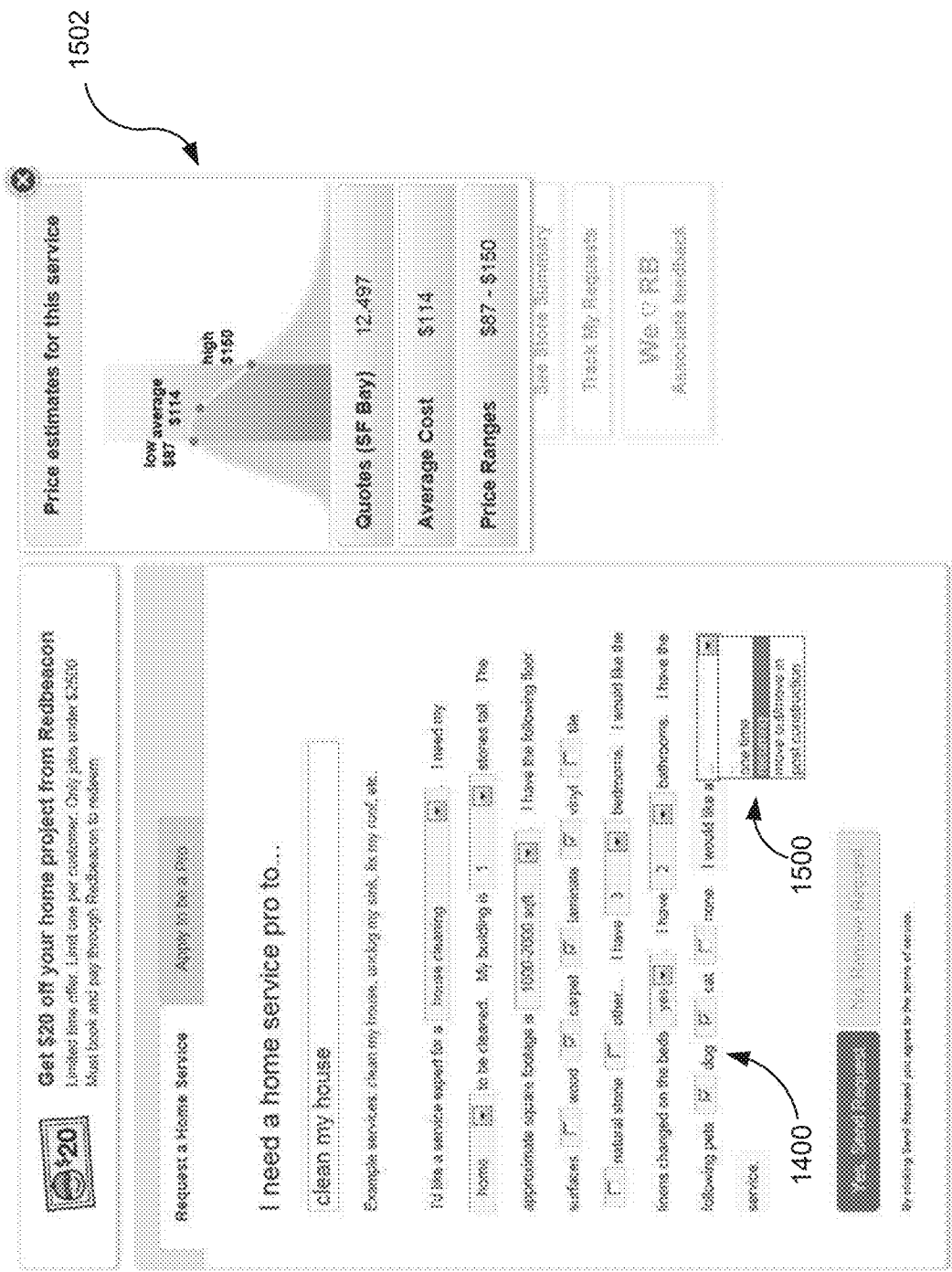
FIG. 15 is a graphical representation of a graphical user interface in still an additional specific service detail selection mode of operation in accordance with one aspect of the present disclosure.

FIG. 15 is a graphical representation of a graphical user interface in still an additional specific service detail selection mode of operation in accordance with one aspect of the present disclosure. For example, if the consumer makes specific service detail selections, in labeled checkboxes 1400, indicating that the home to be cleaned has a dog and a cat, then another drop down menu 1500 may be generated. Based on the service category selection, the specific service selection, and the previous specific service detail selections, drop down menu 1500 may prompt the consumer to make a selection indicating a type of home cleaning service that is desired (e.g., one time, recurring, move out/move in, or post construction). Also an updated price estimate may be displayed at 1502.

Figure 16:
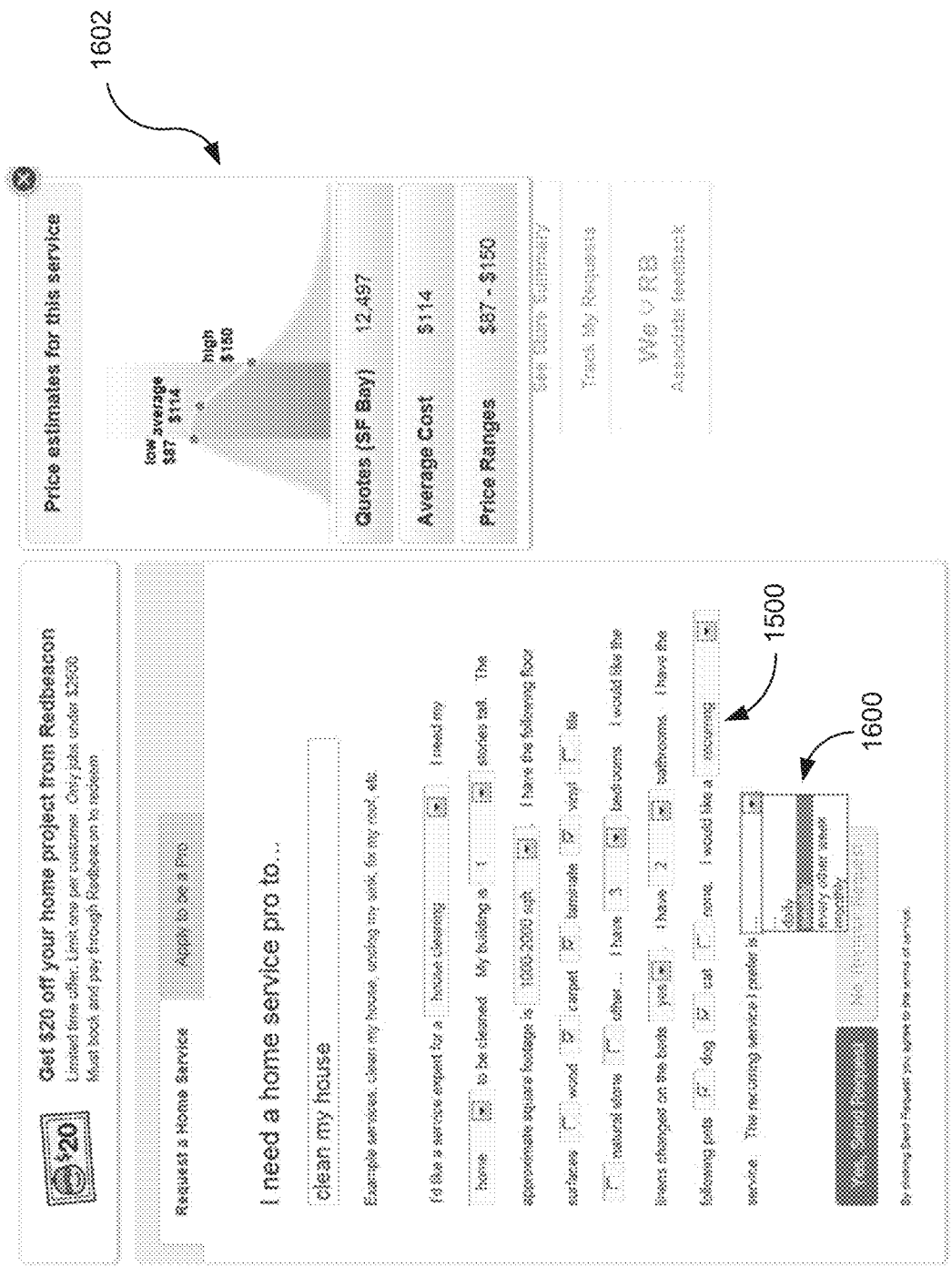
FIG. 16 is a graphical representation of a graphical user interface in still a further specific service detail selection mode of operation in accordance with one aspect of the present disclosure.

FIG. 16 is a graphical representation of a graphical user interface in still a further specific service detail selection mode of operation in accordance with one aspect of the present disclosure. For example, if the consumer makes a specific service detail selection, in drop down menu 1500, indicating a recurring service is desired, then another drop down menu 1600 may be generated. Based on the service category selection, the specific service selection, and the previous specific service detail selections, drop down menu 1600 may prompt the consumer to make a selection indicating a frequency of recurrence of cleaning of the home to be cleaned. Also an updated price estimate may be displayed at 1602.

Figure 17:
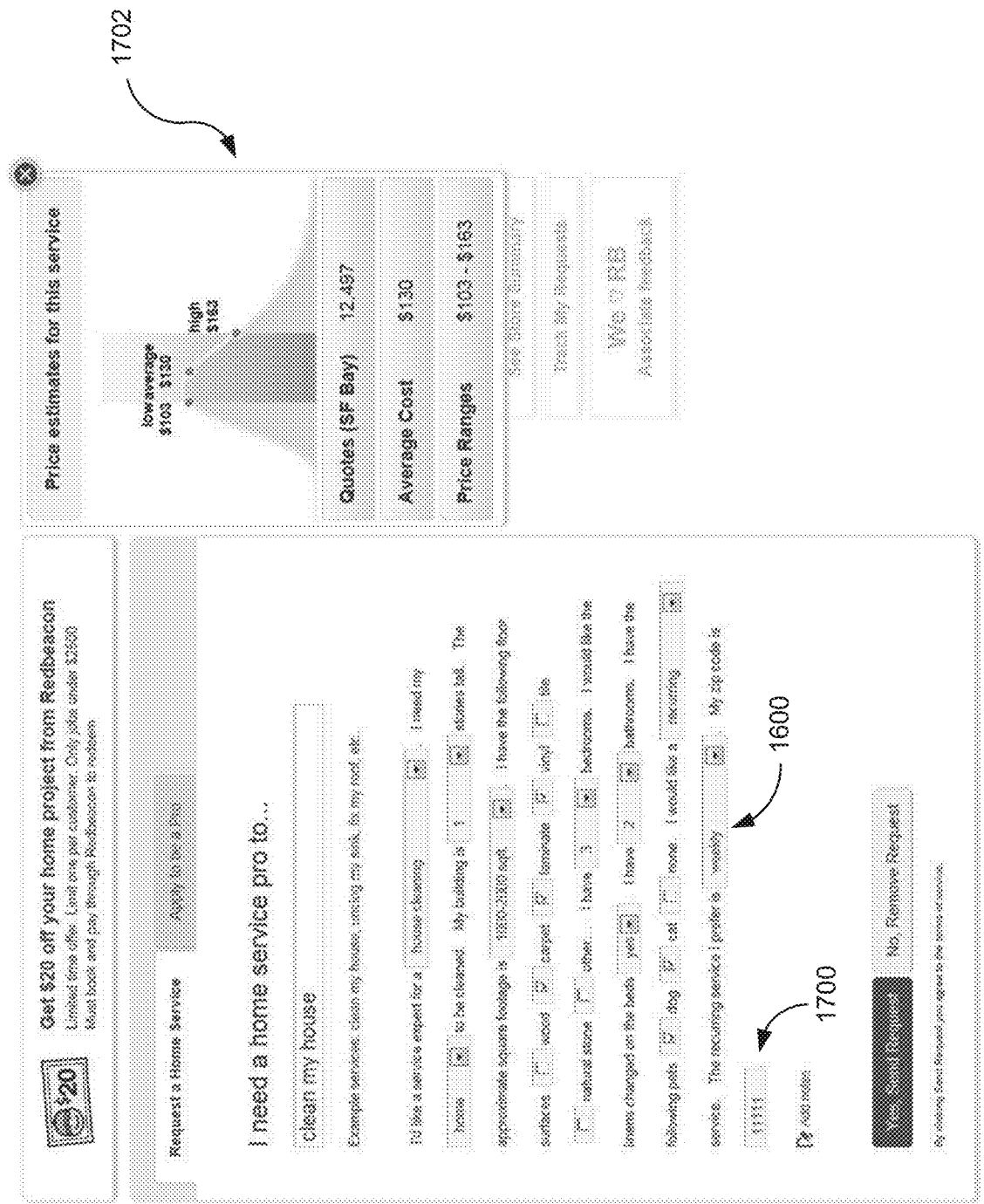
FIG. 17 is a graphical representation of a graphical user interface in a zip code definition mode of operation in accordance with one aspect of the present disclosure.

FIG. 17 is a graphical representation of a graphical user interface in a zip code definition mode of operation in accordance with one aspect of the present disclosure. For example, if the consumer makes a specific service detail selection, in drop down menu 1600, indicating a weekly recurring service is desired, then text box 1700 may be generated. Based on completion of all specific service detail selections, text box 1700 may prompt the consumer to provide a zip code. Also an updated price estimate may be displayed at 1702. The display of the price estimate at 1702 may occur immediately upon selection, by the consumer, of the weekly recurrence option. Accordingly, the consumer can readily appreciate that selecting the weekly recurrence option is likely to have a significant impact on the price of the requested service. The consumer may make different selections in drop down menu 1600 to generate new price estimates, and thus gain an appreciation for the costs associated with selecting the different options in drop down menu 1600.

Figure 18:
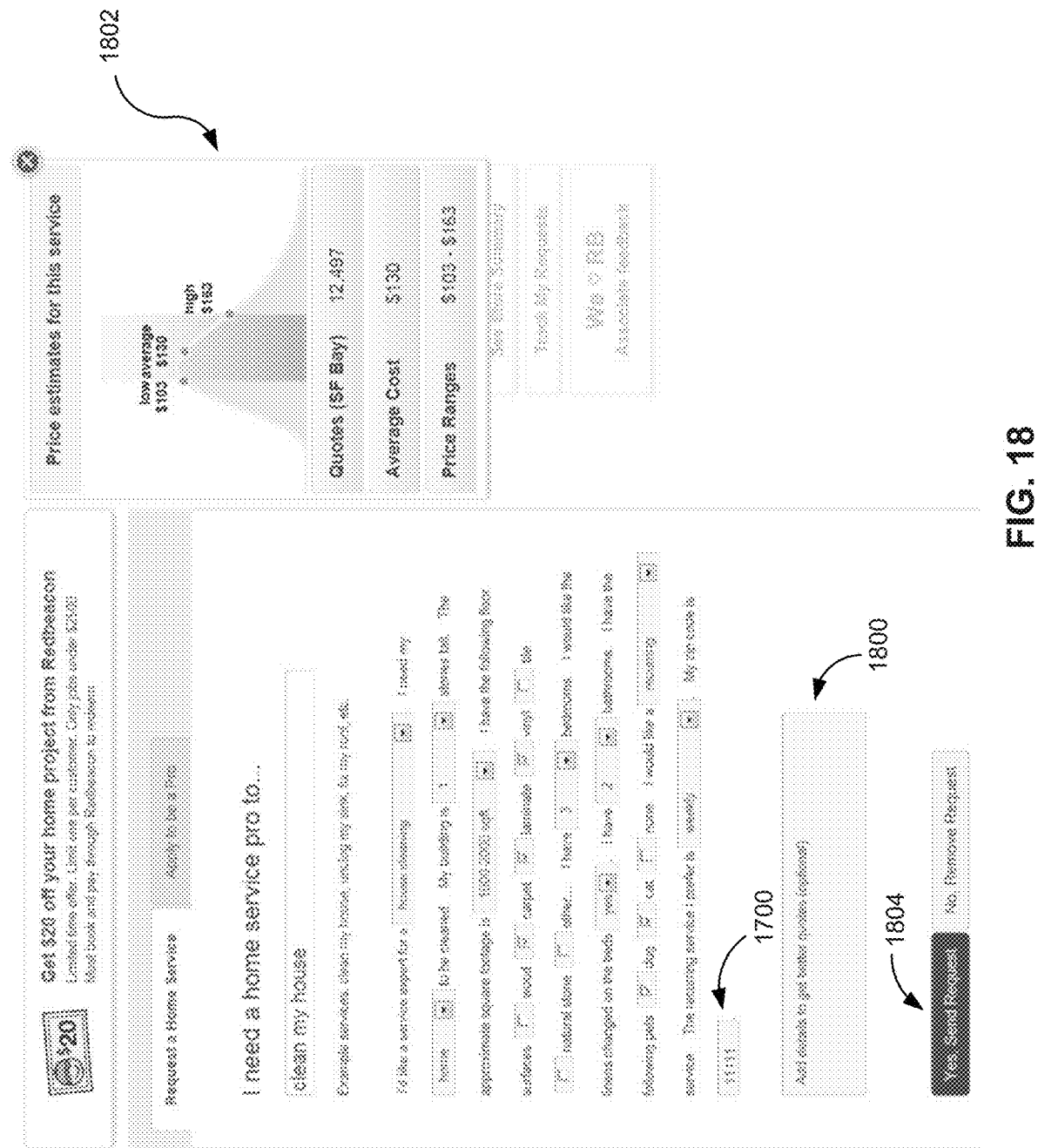
FIG. 18 is a graphical representation of a graphical user interface in an optional details definition mode of operation in accordance with one aspect of the present disclosure.

FIG. 18 is a graphical representation of a graphical user interface in an optional details definition mode of operation in accordance with one aspect of the present disclosure. For example, once the consumer provides the zip code information in text box 1700, then another text box 1800 may be generated. Text box 1800 may permit the consumer to provide any additional details not otherwise specified. These additional details may be included in the textual info of the service request that is sent to service professionals. These additional details may also be saved and reviewed by system designers to determine if additional or alternative questions should be added to the interface. Also an updated price estimate may be displayed at 1802. A submit button 1804 may permit the consumer to submit the service request and agree to terms of service.

The steps of methods or algorithms described in this disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art; all of these are examples of physical storage media. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In some embodiments, the processor and the storage medium may reside as discrete components in a user terminal.

In one or more exemplary designs, the functions described may be implemented in hardware, software, firmware, or any combination thereof. If implemented in software, the functions may be stored as one or more instructions or code on a non-transitory computer-readable storage medium. A storage media may be any available media that can be accessed by a computer or processor. By way of example, and not limitation, such computer-readable media can comprise RAM, ROM, EEPROM, CD-ROM or other optical disk storage, magnetic disk storage or other magnetic storage devices, or any other non-transitory medium that can be used to store desired program code in the form of instructions or data structures and that can be accessed by a computer or a processor. Disk and disc, as used herein, includes compact disc (CD), laser disc, optical disc, digital versatile disc (DVD), floppy disk, and blu-ray disc, where disks usually reproduce data magnetically, while discs reproduce data optically with lasers. Combinations of the above should also be included within the scope of non-transitory computer-readable media.

The use of the foregoing technology allows for the processing of information (e.g., data) that is not possible without the aid of such technology, or at least not at the speed achievable with such technology. Some embodiments of the performance of the disclosed functions may be achieved automatically or otherwise within a certain amount of time, such as an amount of time less than what it would take to perform the function or functions without the use of a computer (or computer system), processor, or processors, including, for example and depending on the embodiment, no more than one hour, no more than 30 minutes, no more than 15 minutes, no more than 10 minutes, no more than one minute, no more than one second, and no more than every time interval in seconds between one second and one hour.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the illustrative embodiment of the present devices is not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

What is claimed is:

1. A method comprising:
    obtaining, at a server, service requests from consumer computing devices;
    obtaining, at the server, bids from service professional computing devices based on the service requests obtained from the consumer computing devices;
    generating, at the server, a training set based on the bids and the service requests, wherein the generating of the training set comprises:
        establishing an empty training set data structure;
        retrieving, from a database, a plurality of service requests R and bid data B(R) comprising bids b associated with the service requests; and
        for each service request R in the plurality of service requests:
            for each bid b in the bid data B(R) associated with the service request R:
                adding to the training set data structure an entry comprising the service request R and the bid b;
    generating, by the server, a model for generating price estimates based on the training set;
    sending, by the server, the model to be stored as part of an application on a consumer computing device; and
    employing the model, by the consumer computing device, to generate a new price estimate based on an additional service request provided through the consumer computing device.

2. The method of claim 1, wherein causing the model to be stored on the consumer computing device enables the new price estimate to be generated by the model on the consumer computing device when the consumer computing device is offline.

3. The method of claim 1, further comprising prompting a consumer, through the application, to make at least one of service category selection or a specific service selection as a part of providing the additional service request.

4. The method of claim 3, further comprising:
    receiving, by the application, at least one of the service category selection or the specific service selection;
    prompting the consumer, through the application, to make one or more specific service detail selections based on the specific service selection; and
    receiving, by the application, one or more specific service detail selections from the consumer,
    wherein prompting the consumer to make one or more specific service detail selections is further based on one or more specific service detail selections previously received by the application.

5. The method of claim 4, wherein employing the model to generate the new price estimate includes performing generation of a new price estimate upon receipt of each of the service category selection, the specific service selection, and the one or more specific service detail selections.

6. The method of claim 1, further comprising displaying, on the consumer computing device, the new price estimate.

7. The method of claim 1, wherein generating the model includes applying a machine learning algorithm to the entries in the training set data structure to obtain a model M that approximates each bid b for each service request R in the training set data structure.

8. The method of claim 7, wherein employing the model to generate the price estimates includes applying the model M to a partially completed service request to generate a price estimate.

9. The method of claim 1, wherein generating the training set further comprises:
    retrieving, from a database, characteristics of consumers U(R) making the service requests, and characteristics of service professionals P(b) making bids b responsive to the service requests; and
    for each of the service request R in the database:
        for each of the bid b associated with the service request R in the bid data B(R):
            adding to the entry in the training set data structure, the characteristics of the consumer U(R) and the characteristics of the service professionals P(b).

10. The method of claim 9, wherein generating the model to generate price estimates includes applying a machine learning algorithm to the entries in the training set data structure to obtain a model M that approximates each bid b and characteristics of service professionals P(b) for each service request R and characteristics of consumer U(R) in the training set data structure.

11. The method of claim 1, further comprising serving the application to the consumer computing device over a communications network.

12. The method of claim 1, wherein the consumer computing devices comprise mobile devices.

13. A method comprising:
    obtaining, by a server, service requests from consumer computing devices;
    obtaining, by the server, bids from service professional computing devices based on the service requests obtained from the consumer computing devices;

generating, by the server, a training set based on the bids and the service requests, wherein the generating of the training set comprises:
  establishing an empty training set data structure;
  retrieving, from a database, a plurality of service requests R and bid data B(R) comprising bids b associated with the service requests; and
  for each service request R in the plurality of service requests:
    for each bid b in the bid data B(R) associated with the service request R:
      adding to the training set data structure an entry comprising the service request R and the bid b;
generating, by the server, a model for generating price estimates based on the training set;
sending, by the server, the model to be stored as part of an application on a mobile communication device; and
employing the model, by the mobile communication device, to generate a new price estimate based on an additional service request provided through the mobile communication device.

14. The method of claim 13, wherein the mobile communication device comprises a phone or a tablet.

15. The method of claim 13, wherein causing the model to be stored on the mobile communication device enables the new price estimate to be generated by the model on the mobile communication device when the mobile communication device is offline.

16. The method of claim 13, further comprising displaying, on the mobile communication device, the new price estimate.

17. The method of claim 13, further comprising prompting a consumer, through the application, to make at least one of service category selection or a specific service selection as a part of providing the additional service request.

18. The method of claim 13, further comprising serving the application to the mobile communication device over a communications network.

19. The method of claim 13, wherein the consumer computing devices comprise a plurality of mobile communication devices.

20. A system comprising one or more servers and a consumer computing device, wherein:
  the one or more servers are configured to:
    obtain service requests from consumers;
    obtain bids from service professionals based on the service requests obtained from the consumers; and
    generate a training set based on the bids and the service requests, wherein the generate of the training set comprises:
      establish an empty training set data structure;
      retrieve, from a database, a plurality of service requests R and bid data B(R) comprising bids b associated with the service requests; and
      for each service request R in the plurality of service requests:
        for each bid b in the bid data B(R) associated with the service request R:
          add to the training set data structure an entry comprising the service request R and the bid b;
    generate a model for generating price estimates based on the training set;
  the consumer computing device is configured to:
    store the model as part of an application on the consumer computing device; and
    employ the model to generate a new price estimate based on an additional service request provided through the consumer computing device.

* * * * *